(12) United States Patent
Liu

(10) Patent No.: US 9,462,003 B2
(45) Date of Patent: Oct. 4, 2016

(54) BIDIRECTIONAL AUTHORIZATION SYSTEM, CLIENT AND METHOD

(71) Applicant: ZTE Corporation, Shenzhen, Guangdong (CN)

(72) Inventor: Xian Liu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/770,751

(22) PCT Filed: Sep. 23, 2013

(86) PCT No.: PCT/CN2013/084020
§ 371 (c)(1),
(2) Date: Aug. 26, 2015

(87) PCT Pub. No.: WO2014/131279
PCT Pub. Date: Sep. 4, 2014

(65) Prior Publication Data
US 2016/0006743 A1    Jan. 7, 2016

(30) Foreign Application Priority Data

Mar. 1, 2013   (CN) .......................... 2013 1 0066662

(51) Int. Cl.
*H04L 29/06* (2006.01)
*H04L 9/32* (2006.01)
*G06F 21/31* (2013.01)

(52) U.S. Cl.
CPC .............. *H04L 63/102* (2013.01); *G06F 21/31* (2013.01); *H04L 9/32* (2013.01); *H04L 9/3228* (2013.01); *H04L 63/08* (2013.01); *H04L 63/0815* (2013.01); *H04L 63/0876* (2013.01)

(58) Field of Classification Search
None
See application file for complete search history.

(56) References Cited

U.S. PATENT DOCUMENTS 8,800,009 B1 *   8/2014   Beda, III ............ H04L 63/0846
                                                       713/155
2008/0162926 A1   7/2008   Xiong (Continued)

FOREIGN PATENT DOCUMENTS

CN   102394887 A   3/2012
CN   102611709 A   7/2012

(Continued)

OTHER PUBLICATIONS

Luis de la Fuente Valetin, "User Identity in Mashups for Learning Experiences using IMS Learning Design", Carlos III University of Madrid, 2010, pp. 1-13.*

(Continued)

*Primary Examiner* — Benjamin Lanier
(74) *Attorney, Agent, or Firm* — Oppedahl Patent Law Firm LLC

(57) ABSTRACT

Disclosed is a bidirectional authorization system, including a first service provision subsystem configured to acquire a first temporary credential of the first service provision subsystem and a second temporary credential of a second service provision subsystem, respectively, send the second and the first temporary credential to the user terminal and the second service provision subsystem, respectively, send the second authorization credential returned by the user terminal to the second service provision subsystem to exchange for a second access token and acquire the second service resources; a second service provision subsystem configured to modify the first temporary credential and send it to the user terminal, send the first authorization credential returned by the user terminal to the first service provision subsystem to exchange for a first access token, and acquire the first service resources; and a user terminal configured to authorize the received second and first temporary credentials, respectively, and return the second and first authorization credentials to the first and second service provision subsystems, respectively. A bidirectional authorization client and a method are also disclosed. The present disclosure can be used to enable clients on both sides to simultaneously access resources of the opposite side.

11 Claims, 2 Drawing Sheets

(56) References Cited

U.S. PATENT DOCUMENTS

| | | | | |
|---|---|---|---|---|
| 2009/0254745 | A1* | 10/2009 | Ganesan | H04L 63/06 713/151 |
| 2013/0019295 | A1 | 1/2013 | Park et al. | |
| 2013/0086645 | A1* | 4/2013 | Srinivasan | H04L 63/10 726/4 |
| 2014/0007198 | A1* | 1/2014 | Durbha | H04L 63/102 726/4 |
| 2014/0068746 | A1 | 3/2014 | Gonzalez Martinez | |
| 2014/0189808 | A1* | 7/2014 | Mahaffey | H04L 63/0853 726/4 |

FOREIGN PATENT DOCUMENTS

| | | |
|---|---|---|
| CN | 102761537 A | 10/2012 |
| CN | 102761549 A | 10/2012 |
| WO | 2012069263 A2 | 5/2012 |

OTHER PUBLICATIONS

Hardt, "The OAuth 2.0 Authorization Framework", RFC 6749, 2012, pp. 1-77.*
International Search Report in international application No. PCT/CN2013/084020, mailed on Jan. 2, 2014.
English Translation of the Written Opinion of the International Search Authority in international application No. PCT/CN2013/084020, mailed on Jan. 2, 2014.
Supplementary European Search Report in European application No. 13876510.2, mailed on Feb. 12, 2016.

* cited by examiner

BIDIRECTIONAL AUTHORIZATION SYSTEM, CLIENT AND METHOD

TECHNICAL FIELD

The present disclosure relates to an authorization technology in the Internet, and in particular, to a system, a client and a method for bidirectional authorization.

BACKGROUND

If a client intends to access protected resources of a user on a server side, the client has to use the identity credentials of the user, such as, the name of the user and the password. If a client of the third party also wants to access the protected resources of the user on the server side, it is necessary to provide the identity credentials of the user for the client of the third party. As such, there exist huge potential safety hazards.

In order to solve the abovementioned problem, an Open Auth (OAuth) protocol is provided, which is a safe, open and simple standard for authorization of users' resources. The OAuth protocol employs an intermediate layer to separate a client from an authorization procedure of a user. A client of the third party may apply for authorization and obtain resources from the user without reaching the credential information of the user. The OAuth protocol defines four roles including a resources owner, a client, a resources server and an authorization server. The resources owner is a user who owns resources and may authorize a client to access its resources. The client is a client program which accesses protected resources. The resources server is a server which stores the resources of the resources owner and can be accessed by the client only after the client is authorized by the resources owner. The authorization server is responsible for generating an access token and sending the same to the client after receiving the credentials of the user from the resources owner.

By the OAuth protocol, the client of the third party may access the protected resources of the user on the side of the resources server after obtaining the authorization from the user. However, the OAuth protocol is a unidirectional authorization protocol and only allows a client of the third party to request a unidirectional authorization for the resources server. It does not allow a client to request an authorization for a resources server of the third party. By way of example, when the client is a microblog while the client of the third party is a blog, the resources server stores protected microblog information of the user and a resources server of the third party stores protected blog information of the user. The blog client can access the microblog information on the side of the resources server after obtaining authorization from the resources owner. The micoblog client, however, cannot access the blog information on the side of the resources server of the third party.

SUMMARY

Given that, the present disclosure is intended to provide a system, clients and a method for bidirectional authorization, so as to enable the clients on both sides to simultaneously access protected resources of the opposite side.

To achieve the aforesaid objectives, the technical solutions of the embodiments of the present disclosure are implemented in the following way.

A system for bidirectional authorization is provided, which includes a first service provision subsystem, a second service provision subsystem and a user terminal, wherein the first service provision subsystem is configured to acquire a first temporary credential of the first service provision subsystem and a second temporary credential of the second service provision subsystem, respectively, send the second temporary credential to the user terminal for authorization, receive a second authorization credential returned by the user terminal, send the second authorization credential to the second service provision subsystem to exchange for a second access token, acquire resources in the second service provision subsystem according to the second access token and send the first temporary credential to the second service provision subsystem;

the second service provision subsystem is configured to receive the first temporary credential from the first service provision subsystem, modify an identifier in the first temporary credential, send the modified first temporary credential to the user terminal for authorization, receive a first authorization credential returned by the user terminal, send the first authorization credential to the first service provision subsystem to exchange for a first access token, and acquire resources in the first service provision subsystem according to the first access token; and the user terminal is configured to respectively receive the second temporary credential from the first service provision subsystem and the first temporary credential from the second service provision subsystem, respectively authorize the second and first temporary credentials, and send the second and first authorization credentials to the first and second service provision subsystems, respectively.

In the above solution, the first service provision subsystem may include a first client, a first OAuth server and a first resources server; wherein the first client is configured to send commands for requesting a temporary credential to the first OAuth server and the second service provision subsystem, respectively, receive the first and second temporary credentials returned respectively by the first OAuth server and the second service provision subsystem, send the second temporary credential to the user terminal for authorization; receive the second authorization credential returned by the user terminal, send the second authorization credential to the second service provision subsystem to exchange for a second access token, send the second access token to the second service provision subsystem for authentication, access the resources provided by the second service provision subsystem after successful authentication by the second service provision subsystem, and send the first temporary credential to the second service provision subsystem for modification of a client identifier.

the first OAuth server is configured to receive the command for requesting temporary credential from the first client, return the first temporary credential to the first client according to the command, receive the first authorization credential from the second service provision subsystem, return the first access token to the second service provision subsystem and send the first access token to the first resources server to serve as a basis of the authentication; and the first resources server is configured to receive the first access token from the second service provision subsystem, authenticate the first access token sent by the second service provision subsystem according to the first access token sent by the first OAuth server, and provide first service resources to the second service provision subsystem for access after successful authentication.

In the above solution, the second service provision subsystem may include a second client, a second OAuth server and a second resources server; wherein the second client is configured to receive the first temporary credential from the first service provision subsystem and modify the identifier of the first client in the first temporary credential to be an identifier of the second client, send the modified first temporary credential to the user terminal for authorization, receive the first authorization credential returned by the user terminal, send the first authorization credential to the first service provision subsystem to exchange for the first access token, send the first access token to the first service provision subsystem for authentication, and access the resources provided by the first service provision subsystem after the successful authentication by the first service provision subsystem;

the second OAuth server is configured to receive the command for requesting a temporary credential from the first service provision subsystem, return the second temporary credential to the first service provision subsystem according to the command, receive the second authorization credential from the first service provision subsystem, return the second access token to the first service provision subsystem and send the second access token to the second resources server to serve as a basis of the authentication; and The second resources server is configured to receive the second access token from the first service provision subsystem, authenticate the second access token sent by the first service provision subsystem according to the second access token sent by the second OAuth server, and provide second service resources to the first service provision subsystem for access after successful authentication.

In the above solution, the second service provision subsystem may include a second client, a second OAuth server and a second resources server;

the first client is configured to send the commands for requesting a temporary credential to the first OAuth server and the second OAuth server, respectively, receive the first and second temporary credentials returned by the first OAuth server and the second OAuth server, respectively, send the second temporary credential to the user terminal for authorization; receive the second authorization credential returned by the user terminal, send the second authorization credential to the second OAuth server to exchange for the second access token, send the second access token to the second resources server for authentication, and access the resources provided by the second resources server after successful authentication by the second resources server. The first client is further configured to send the first temporary credential to the second client;

The first OAuth server is configured to receive the command for requesting a temporary credential from the first client, return the first temporary credential to the first client according to the command, receive the first authorization credential from the second client, return the first access token to the second client and send the first access token to the first resources server to serve as a basis of the authentication;

the first resources server is configured to receive the first access token from the second client, authenticate the first access token sent by the second client according to the first access token sent by the first OAuth server, and provide the first service resources to the second client for access after successful authentication.

the second client is configured to receive the first temporary credential from the first OAuth server and modify the identifier of the first client in the first temporary credential to be the identifier of the second client, send the modified first temporary credential to the user terminal for authorization, receive the first authorization credential returned by the user terminal, send the first authorization credential to the first OAuth server to exchange for a first access token, send the first access token to the first resources server for authentication, and access the resources provided by the first resources server after the successful authentication by the first resources server;

the second OAuth server is configured to receive the command for requesting temporary credential from the first client, return the second temporary credential to the first client according to the command, receive the second authorization credential from the first client, return the second access token to the first client and send the second access token to the second resources server as a basis of the authentication; and the second resources server is configured to receive the second access token from the first client, authenticate the second access token sent by the first client according to the second access token sent by the second OAuth server, and provide second service resources to the first client for access after successful authentication.

In the above solution, the command for requesting a temporary credential is carried by a temporary credential request packet defined by an OAuth protocol.

According to an embodiment of the present disclosure, a client is provided in a service provision subsystem. The service provision subsystem further includes an OAuth server and a resources server. The client includes a temporary credential acquisition module, an access token acquisition module and a resources acquisition module, wherein the temporary credential acquisition module is configured to send commands for requesting a temporary credential to the OAuth server of the service provision subsystem at a local side and an OAuth server of a service provision subsystem at the other side, respectively, receive the temporary credential returned by the OAuth server of the service provision subsystem at the local side and the second temporary credential returned by the OAuth server of the service provision subsystem at the other side, respectively, and send the first temporary credential to a client of the service provision subsystem at the other side;

the access token acquisition module is configured to send the second temporary credential to a user terminal for authorization, receive a second authorization credential returned by the user terminal and send the second authorization credential to the OAuth server of the service provision subsystem at the other side to exchange for a second access token; and the resources acquisition module is configured to send the second access token to a resources server of the service provision subsystem at the other side for authentication, access resources provided by the resources server of the service provision subsystem at the other side after successful authentication by the resources server of the service provision subsystem at the other side.

According to an embodiment of the present disclosure, a client is provided in a service provision subsystem. The service provision subsystem further includes an OAuth server and a resources server. The client includes a temporary credential acquisition module, an access token acquisition module and a resources acquisition module, wherein the temporary credential acquisition module is configured to receive a first temporary credential from an OAuth server of a service provision subsystem at the other side, and modify a client identifier of the service provision subsystem at the other side in the first temporary credential to be a client identifier of the service provision subsystem at a local side;

the access token acquisition module is configured to send the modified first temporary credential to a user terminal for authorization, receive a first authorization credential returned by the user terminal, and send the first authorization credential to the OAuth server of the service provision subsystem at the other side to exchange for a first access token; and The resources acquisition module is configured to send the first access token to a resources server of the service provision subsystem at the other side for authentication, and access resources provided by the resources server of the service provision subsystem at the other side after successful authentication by the resources server of the service provision subsystem at the other side.

According to an embodiment of the present disclosure, a method for bidirectional authorization is provided, which includes:

a first service provision subsystem acquires a first temporary credential of the first service provision subsystem and a second temporary credential of a second service provision subsystem, sends the second temporary credential to a user terminal for authorization and obtains a second authorization credential, sends the second authorization credential to the second service provision subsystem to exchange for a second access token, acquires resources in the second service provision subsystem according to the second access token, and sends the first temporary credential to the second service provision subsystem for modification of an identifier; and the second service provision subsystem sends the modified first temporary credential to the user terminal for authorization and obtains a first authorization credential, sends the first authorization credential to the first service provision subsystem to exchange for a first access token, and acquires resources in the first service provision subsystem according to the first access token.

In the above solution, acquiring, by the first service provision subsystem, the first temporary credential of the first service provision subsystem and the second temporary credential of the second service provision subsystem may specifically include:

sending, by a first client of the first service provision subsystem, commands for requesting a temporary credential to a first OAuth server of the first service provision subsystem and a second OAuth server of the second service provision subsystem, respectively, and receiving the first and second temporary credentials respectively returned by the first and second OAuth servers.

In the above solution, the authorization for the first temporary credential may include inputting a user name and a password of the first service provision subsystem, wherein the user name and the password are a user name and a password registered by the user terminal at the first service provision subsystem; and the authorization for the second temporary credential may include inputting a user name and a password of the second service provision subsystem, wherein the user name and the password are a user name and a password registered by the user terminal at the second service provision subsystem.

Based on the system, the clients and the method for bidirectional authorization according to the embodiments of the present disclosure, the first service provision subsystem acquires its own first temporary credential and the second temporary credential of the second service provision subsystem, respectively, sends the second temporary credential to the user terminal for authorization, sends the second authorization credential to the second service provision subsystem to exchange for the second access token, acquires the resources in the second service provision subsystem according to the second access token and sends the first temporary credential to the second service provision subsystem for modification of the identifier. The second service provision subsystem sends the modified first temporary credential to the user terminal for authorization, sends the first authorization credential to the first service provision subsystem to exchange for the first access token, and acquires resources in the first service provision subsystem according to the first access token. As such, the second service provision subsystem can also access the resources in the first service provision subsystem while the first service provision subsystem is accessing the resources in the second service provision subsystem.

DETAILED DESCRIPTION

The embodiments of the present disclosure will be set forth in detail with reference to the accompanying drawings hereafter so as to further understand the features and technical contents of the present disclosure, and thus, the accompanying drawings are only used for explanation rather than limitation of the present disclosure.

Figure 1:
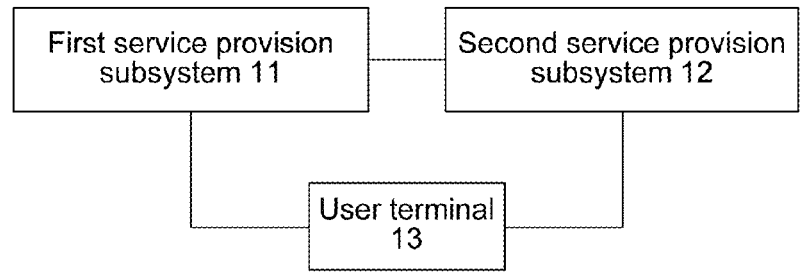
FIG. 1 is a first schematic diagram of the structural configuration of a system for bidirectional authorization according to an embodiment of the present disclosure.

FIG. 1 is a first schematic diagram of the structural configuration of a system for bidirectional authorization according to an embodiment of the present disclosure. As shown in FIG. 1, the system includes a first service provision subsystem 11, a second service provision subsystem 12 and a user terminal 13.

The first service provision subsystem 11 is configured to acquire a first temporary credential of the first service provision subsystem 11 and a second temporary credential of the second service provision subsystem 12, respectively, send the second temporary credential to the user terminal 13 for authorization, receive a second authorization credential returned by the user terminal 13, send the second authorization credential to the second service provision subsystem 12 to exchange for a second access token, acquire resources in the second service provision subsystem 12 according to the second access token and send the first temporary credential to the second service provision subsystem 12.

The second service provision subsystem 12 is configured to receive the first temporary credential sent from the first service provision subsystem 11, modify an identifier in the first temporary credential, send the modified first temporary credential to the user terminal 13 for authorization, receive a first authorization credential returned by the user terminal 13, send the first authorization credential to the first service provision subsystem 11 to exchange for a first access token, and acquire resources in the first service provision subsystem 11 according to the first access token.

The user terminal 13 is configured to respectively receive the second temporary credential from the first service provision subsystem 11 and the first temporary credential from the second service provision subsystem 12, respectively authorize the second and first temporary credentials, and send the second and first authorization credentials to the first and second service provision subsystems 11 and 12, respectively.

In practice, the first service provision subsystem 11 and the second service provision subsystem 12 in the system for bidirectional authorization may be implemented by servers providing a function of service. The user terminal 13 may be implemented as any type of terminals, such as a phone, a computer, and the like.

Figure 2:
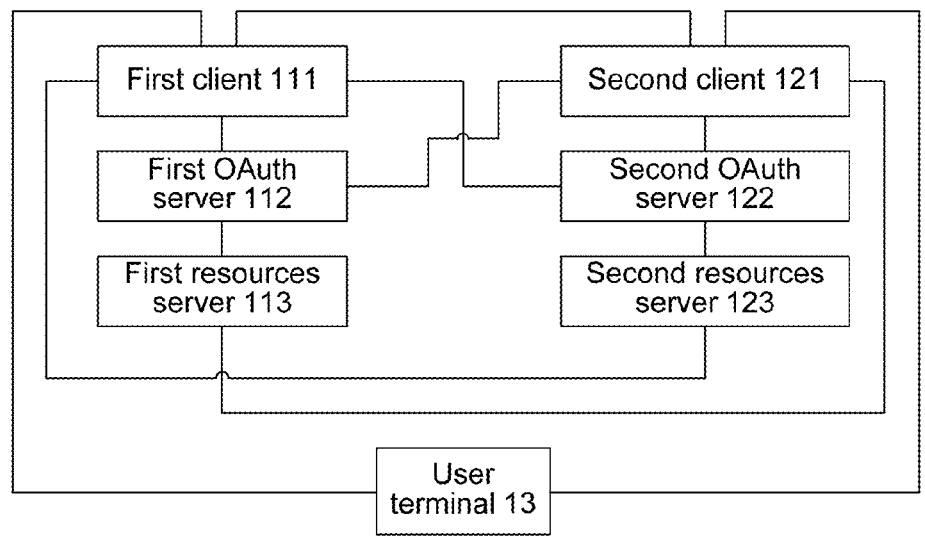
FIG. 2 is a second schematic diagram of the structural configuration of a system for bidirectional authorization according to an embodiment of the present disclosure.

FIG. 2 is a second schematic diagram of the structural configuration of a system for bidirectional authorization according to an embodiment of the present disclosure. As shown in FIG. 2, the first service provision subsystem includes a first client 111, a first OAuth server 112 and a first resources server 113. The second service provision subsystem includes a second client 121, a second OAuth server 122 and a second resources server 123.

The first client 111 is configured to send commands for requesting a temporary credential to the first OAuth server 112 and the second service provision subsystem, respectively, receive the first and second temporary credentials returned respectively by the first OAuth server 112 and the second service provision subsystem, send the second temporary credential to the user terminal 13 for authorization; receive the second authorization credential returned by the user terminal 13, send the second authorization credential to the second service provision subsystem to exchange for a second access token, send the second access token to the second service provision subsystem for authentication, access the resources provided by the second service provision subsystem after the successful authentication by the second service provision subsystem, and send the first temporary credential to the second service provision subsystem.

Herein, sending the command for requesting a temporary credential to the second service provision subsystem and receiving the second temporary credential returned by the second service provision subsystem may specifically include sending the command for requesting a temporary credential to the second OAuth server 122 of the second service provision subsystem and receiving the second temporary credential returned by the second OAuth server 122 of the second service provision subsystem.

Herein, sending the first temporary credential to the second service provision subsystem for modification of a client identifier may specifically include sending the first temporary credential to the second client 121 of the second service provision subsystem for modification of the client identifier.

Herein, sending the second authorization credential to the second service provision subsystem to exchange for a second access token may specifically include sending the second authorization credential to the second OAuth server 122 of the second service provision subsystem to exchange for the second access token.

Herein, sending the second access token to the second service provision subsystem for authentication, and accessing the resources provided by the second service provision subsystem after the successful authentication by the second service provision subsystem may specifically include sending the second access token to the second resources server 123 of the second service provision subsystem for authentication, and accessing the resources provided by the second resources server 123 of the second service provision subsystem after the successful authentication by the second resources server 123 of the second service provision subsystem.

The first OAuth server 112 is configured to receive the command for requesting a temporary credential from the first client 111, return the first temporary credential to the first client 111 according to the command, receive the first authorization credential from the second service provision subsystem, return the first access token to the second service provision subsystem and send the first access token to the first resources server 113 as a basis of the authentication.

Herein, the second service provision subsystem specifically refers to the second client 121 of the second service provision subsystem.

The first resources server 113 is configured to receive the first access token from the second service provision subsystem, authenticate the first access token sent by the second service provision subsystem according to the first access token sent by the first OAuth server 112, and provide first service resources to the second service provision subsystem for access after successful authentication.

Herein, the second service provision subsystem specifically refers to the second client 121 of the second service provision subsystem.

Herein, the authenticating may include comparing the two access tokens, and determining the authentication is successful if they are the same; otherwise, if the two access tokens are different, then determining that the authenticating unsuccessful.

In the above solution, the commands for requesting a temporary credential are carried by temporary credential request packets defined by an OAuth protocol and the packets carry identifiers of the clients. Preferably, since the commands for requesting a temporary credential are sent by the first service provision subsystem, the commands for requesting a temporary credential carry the identifier of the first client.

In the above solution, the first and second temporary credentials are transmitted via the response packets defined by the OAuth protocol and the packets carry the identifier of the first client. Thus, when the first temporary credential is sent to the second client 121, the identifier of the first client carried by the first temporary credential is modified as the identifier of the second client.

In the above solution, the temporary credentials are requested and received in a manner of HyperText Transport Protocol (HTTP) and are kept safe by a Secure Sockets Layer (SSL) or similar secure means.

In the above solution, authorization for the second temporary credential may specifically include inputting the user name and password of the second service provision subsystem; and authorization for the first temporary credential may specifically include inputting the user name and password of the first service provision subsystem.

The second client 121 is configured to receive the first temporary credential from the first service provision subsystem and modify the identifier of the first client in the first temporary credential to be the identifier of the second client, send the modified first temporary credential to the user terminal 13 for authorization, receive the first authorization credential returned by the user terminal 13, send the first authorization credential to the first service provision subsystem to exchange for a first access token, send the first access token to the first service provision subsystem for authentication, and access the resources provided by the first service provision subsystem after the successful authentication by the first service provision subsystem.

Herein, receiving the first temporary credential from the first service provision subsystem may specifically include receiving first temporary credential from the first client 111 of the first service provision subsystem.

Herein, sending the first authorization credential to the first service provision subsystem to exchange for the first access token may specifically include sending the first authorization credential to the first OAuth server 112 of the first service provision subsystem to exchange for the first access token.

Herein, sending the first access token to the first service provision subsystem for authentication, and accessing the resources provided by the first service provision subsystem after the successful authentication by the first service provision subsystem may specifically include sending the first access token to the first resources server 113 of the first service provision subsystem for authentication, and accessing the resources provided by the first resources server 113 of the first service provision subsystem after the successful authentication by the first resources server 113 of the first service provision subsystem.

The second OAuth server 122 is configured to receive from the first service provision subsystem the command for requesting a temporary credential, return the second temporary credential to the first service provision subsystem according to the command, receive the second authorization credential from the first service provision subsystem, return the second access token to the first service provision subsystem and send the second access token to the second resources server 123 to serve as a basis of the authentication.

Herein, the first service provision subsystem specifically refers to the first client 111 of the first service provision subsystem.

The second resources server 123 is configured to receive the second access token from the first service provision subsystem, authenticate the second access token sent by the first service provision subsystem according to the second access token sent by the second OAuth server 122, and provide the second service resources to the first service provision subsystem for access after successful authentication.

Herein, the first service provision subsystem specifically refers to the first client 111 of the first service provision subsystem.

In the above solution, the first temporary credential is a temporary credential of the first client for the first resources server and the second temporary credential is a temporary credential of the first client for the second resources server. After the client identifier of the first temporary credential is modified, the first temporary credential becomes a temporary credential of the second client for the first resources server. Correspondingly, the first authorization credential is an authorization credential of the second client for the first resources server and the second authorization credential is an authorization credential of the first client for the second resources server. Correspondingly, the first access token is an access token of the second client for the first resources server and the second access token is an access token of the first client for the second resources server.

In the above solution, the first service provision subsystem is a service provision subsystem at the initiating side and the second service provision subsystem is a service provision subsystem at the receiving side. In practice, the second service provision subsystem may be also a service provision subsystem at the initiating side and the first service provision subsystem may be also a service provision subsystem at the receiving side. In this case, the second client 121, the second OAuth server 122 and the second resources server 123 included in the second service provision subsystem perform the functions of the first client 111, the first OAuth server 112 and the first resources server 113, respectively. The first client 111, the first OAuth server 112 and the first resources server 113 included in the first service provision subsystem perform the functions of the second client 121, the second OAuth server 122 and the second resources server 123, respectively.

In practice, the first client 111 and the first OAuth server 112 of the first service provision subsystem may be implemented by a Central Processing Unit (CPU), a Digital Signal Processor (DSP) or a Field-Programmable Gate Array (FPGA) in the first service provision subsystem. The first resources server 113 may be implemented by a memory in the first service provision subsystem.

The second client 121 and the second OAuth server 122 of the second service provision subsystem may be implemented by a CPU, a DSP or a FPGA in the second service provision subsystem. The second resources server 123 may be implemented by a memory in the second service provision subsystem.

Figure 3:
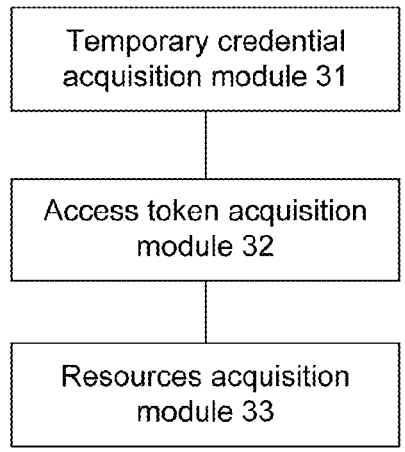
FIG. 3 is a schematic diagram of the structural configuration of a client in the system for bidirectional authorization according to an embodiment of the present disclosure.

FIG. 3 is a schematic diagram of the structural configuration of a client in the system for bidirectional authorization according to an embodiment of the present disclosure. This client is provided in a service provision subsystem which includes the client, an OAuth server, and a resources server. The client includes a temporary credential acquisition module 31, an access token acquisition module 32 and a resources acquisition module 33.

When the client is a client at the initiating side, the temporary credential acquisition module 31 is configured to send commands for requesting a temporary credential to the OAuth server of the service provision subsystem at the local side and an OAuth server of a service provision subsystem at the other side, respectively, receive the first and second temporary credentials returned by the OAuth server of the service provision subsystem at the local side and the OAuth server of the service provision subsystem at the other side, respectively, and send the first temporary credential to a client of the service provision subsystem at the other side;

the access token acquisition module 32 is configured to send the second temporary credential to a user terminal for authorization, receive a second authorization credential returned by the user terminal and send the second authorization credential to the service provision subsystem at the other side to exchange for a second access token; and the resources acquisition module 33 is configured to send the second access token to the service provision subsystem at the other side for authentication, access the resources provided by a resources server of the service provision subsystem at the other side after the successful authentication by the resources server of the service provision subsystem at the other side.

When the client is a client at the receiving side, the temporary credential acquisition module 31 is configured to receive the first temporary credential from the OAuth server of the service provision subsystem at the other side, and modify the client identifier of the service provision subsystem at the other side in the first temporary credential to be the client identifier of the service provision subsystem at the local side;

the access token acquisition module 32 is configured to send the modified first temporary credential to the user terminal for authorization, receive the first authorization credential returned by the user terminal, and send the first authorization credential to the OAuth server of the service provision subsystem at the other side to exchange for a first access token; and the resources acquisition module 33 is configured to send the first access token to the resources server of the service provision subsystem at the other side for authentication, and access the resources provided by the resources server of the service provision subsystem at the other side after the successful authentication by the resources server of the service provision subsystem at the other side.

In practice, the temporary credential acquisition module 31, the access token acquisition module 32 and the resources acquisition module 33 of the client may be implemented by a CPU, DSP or FPGA of the client.

Figure 4:
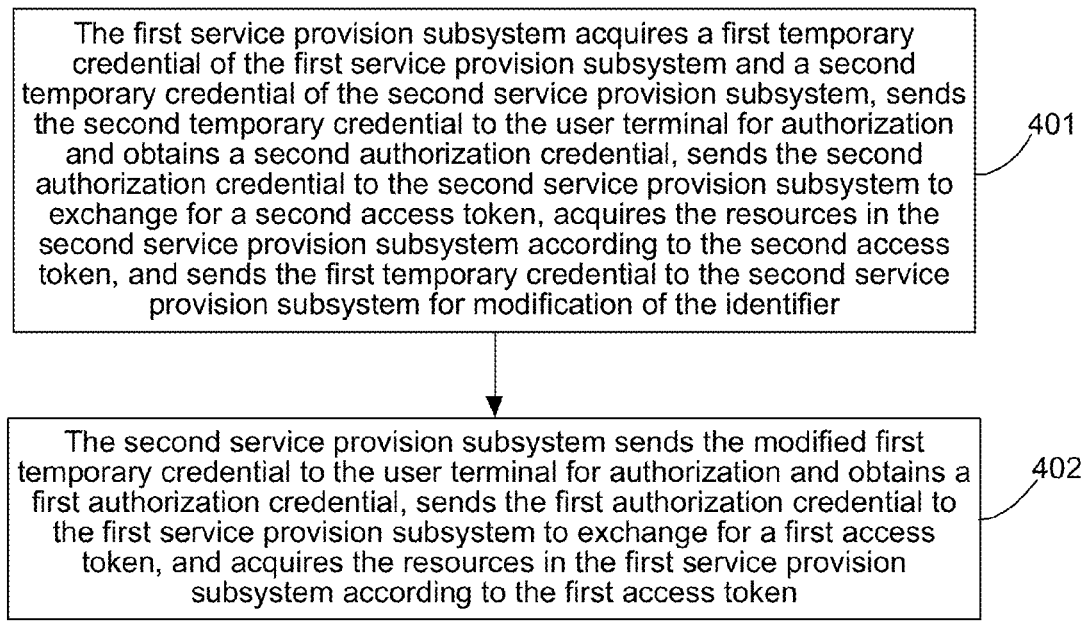
FIG. 4 is a schematic flowchart illustrating the implementation of a method for bidirectional authorization according to an embodiment of the present disclosure.

FIG. 4 is a schematic flowchart illustrating the implementation of a method for bidirectional authorization according to an embodiment of the present disclosure. As shown in FIG. 4, the method includes the following steps.

Step 401 includes that the first service provision subsystem acquires the first temporary credential of the first service provision subsystem and the second temporary credential of the second service provision subsystem, sends the second temporary credential to the user terminal for authorization and obtains the second authorization credential, sends the second authorization credential to the second service provision subsystem to exchange for a second access token, acquires the resources in the second service provision subsystem according to the second access token, and sends the first temporary credential to the second service provision subsystem for identifier modification.

Herein, acquiring, by the first service provision subsystem, the first temporary credential of the first service provision subsystem and the second temporary credential of the second service provision subsystem may specifically include sending, by the first client of the first service provision subsystem, commands for requesting a temporary credential to the first OAuth server of the first service provision subsystem and the second OAuth server of the second service provision subsystem, respectively, and receiving the first and second temporary credentials returned by the first and second OAuth servers, respectively.

In the above solution, the commands for requesting a temporary credential are implemented by packets defined by the OAuth protocol and the packets carry the identifiers of the clients. Preferably, since the first service provision subsystem sends the commands for requesting a temporary credential, the commands for requesting a temporary credential carry the identifier of the first client, such as, dpf43f3p214k3103.

In the above solution, the first and second temporary credentials are transmitted via response packets defined by the OAuth protocol and the response packets carry the identifier of the first client and the first temporary credential or the identifier of the first client and the second temporary credential, such as, hh5s93j4hdidpola.

In the above solution, the temporary credentials are requested and acquired in a manner of HTTP and are kept safe using SSL or similar secure means.

In the above solution, authorization for the second temporary credential may specifically include inputting a user name and a password of the second service provision subsystem, wherein the user name and password are a user name and a password registered by the user terminal at the second service provision subsystem.

In the above solution, acquiring the second service resources in the second service provision subsystem according to the second access token may specifically include sending the second access token to the second service provision subsystem for authentication, and accessing second service resources provided by the second service provision subsystem after the successful authentication by the second service provision subsystem.

Herein, the first temporary credential carries the identifier of the first client. Thus, when the first temporary credential is sent to the second client, the identifier of the first client carried by the first temporary credential is needed to be modified to be the identifier of the second client.

Step 402 includes that the second service provision subsystem sends the modified first temporary credential to the user terminal for authorization and obtains first authorization credential, sends the first authorization credential to the first service provision subsystem to exchange for a first access token, and acquires the resources in the first service provision subsystem according to the first access token.

In the above solution, authorization for the first temporary credential may specifically include inputting a user name and a password of the first service provision subsystem, wherein the user name and password are a user name and a password registered by the user terminal at the first service provision subsystem.

In the above solution, the first service provision subsystem is a service provision subsystem at the initiating side and the second service provision subsystem is a service provision subsystem at the receiving side. In practice, the second service provision subsystem may be a service provision subsystem at the initiating side and the first service provision subsystem may be a service provision subsystem at the receiving side. In this case, the second service provision subsystem performs Step 401 and the first service provision subsystem performs Step 402.

The method for bidirectional authorization provided by the present disclosure will be further described in detail below with reference to a specific example.

It is assumed that a video website and a microblog website are the service provision subsystems in the embodiments of the present disclosure, respectively. A user terminal registers a user name and a password on the video website and registers another user name and password on the microblog website. Both video website and the microblog website have respective clients, OAuth servers and resources servers. The resources server at the video website side is configured to store video resources of the user terminal. The resources server at the microblog website side is configured to store microblog resources of the user terminal.

When the user terminal is intended to share its resources on the video website to the microblog website and share its resources on the microblog website to the video website, the client of the microblog website needs to send commands for requesting a temporary credential to the OAuth server of the microblog website and the OAuth server of the video website, respectively. The OAuth server of the microblog website returns a first temporary credential to the client of the microblog website. The OAuth server of the video website returns a second temporary credential to the client of the microblog website. The client of the microblog website sends the second temporary credential to the user terminal and prompts the user terminal to enter a user name and a password. After the user terminal enters the user name and password registered on the video website, the user terminal returns the second authorization credential to the client of the microblog website. The client of the microblog website sends the second authorization credential to the OAuth server of the video website to exchange for a second access token. As such, the client of the microblog website can share the resources on the video website via the second access token. At the same time, the client of the microblog website sends the first temporary credential to the client of the video website. The client of the video website modifies the first temporary credential and then sends it to the user terminal and prompts the user terminal to enter a user name and a password. After the user terminal enters the user name and password registered on the microblog website, the user terminal returns the first authorization credential to the client of the video website. The client of the video website sends the first authorization credential to the OAuth server of the microblog website to exchange for a first access token. As such, the client of the video website can share the resources on the microblog website via the first access token.

In conclusion, by the method for bidirectional authorization according to the embodiments of the present disclosure, the user terminal can share the resources on the video website to the microblog website and at the same time share the resources on the microblog website to the video website.

The foregoing is only related to the preferable embodiments of the present disclosure and not intended to limit the scope of the present disclosure.

What is claimed is:

1. A system for bidirectional authorization, comprising a first service provision subsystem, a second service provision subsystem and a user terminal, wherein,
the first service provision subsystem is configured to acquire a first temporary credential of the first service provision subsystem and a second temporary credential of the second service provision subsystem, respectively, send the second temporary credential to the user terminal for authorization, receive a second authorization credential returned by the user terminal, send the second authorization credential to the second service provision subsystem to exchange for a second access token, acquire resources in the second service provision subsystem according to the second access token and send the first temporary credential to the second service provision subsystem;
the second service provision subsystem is configured to receive the first temporary credential from the first service provision subsystem, modify an identifier in the first temporary credential, send the modified first temporary credential to the user terminal for authorization, receive a first authorization credential returned by the user terminal, send the first authorization credential to the first service provision subsystem to exchange for a first access token, and acquire resources in the first service provision subsystem according to the first access token; and
the user terminal is configured to respectively receive the second temporary credential from the first service provision subsystem and the first temporary credential from the second service provision subsystem, respectively authorize the second and first temporary credentials, and send the second and first authorization credentials to the first and second service provision subsystems, respectively.

2. The system of claim 1, wherein the first service provision subsystem comprises a first client, a first Open Auth (OAuth) server and a first resources server; wherein,
the first client is configured to send commands for requesting a temporary credential to the first OAuth server and the second service provision subsystem, respectively, receive the first and second temporary credentials returned respectively by the first OAuth server and the second service provision subsystem, send the second temporary credential to the user terminal for authorization; receive the second authorization credential returned by the user terminal, send the second authorization credential to the second service provision subsystem to exchange for a second access token, send the second access token to the second service provision subsystem for authentication, access the resources provided by the second service provision subsystem after successful authentication by the second service provision subsystem, and send the first temporary credential to the second service provision subsystem for modification of a client identifier;
the first OAuth server is configured to receive from the first client the command for requesting a temporary credential, return the first temporary credential to the first client according to the command, receive the first authorization credential from the second service provision subsystem, return the first access token to the second service provision subsystem and send the first access token to the first resources server to serve as a basis of the authentication; and
the first resources server is configured to receive the first access token from the second service provision subsystem, authenticate the first access token sent by the second service provision subsystem according to the first access token sent by the first OAuth server, and provide first service resources to the second service provision subsystem for access after successful authentication.

3. The system of claim 1, wherein the second service provision subsystem comprises a second client, a second OAuth server and a second resources server; wherein,
the second client is configured to receive the first temporary credential from the first service provision subsystem and modify the identifier of a first client in the first temporary credential to be an identifier of the second client, send the modified first temporary credential to the user terminal for authorization, receive the first authorization credential returned by the user terminal, send the first authorization credential to the first service provision subsystem to exchange for the first access token, send the first access token to the first service provision subsystem for authentication, and access the resources provided by the first service provision subsystem after successful authentication by the first service provision subsystem;
the second OAuth server is configured to receive a command for requesting a temporary credential from the first service provision subsystem, return the second temporary credential to the first service provision subsystem according to the command, receive the second authorization credential from the first service provision subsystem, return the second access token to the first service provision subsystem and send the second access token to the second resources server to serve as a basis of the authentication; and
the second resources server is configured to receive the second access token from the first service provision subsystem, authenticate the second access token sent by the first service provision subsystem according to the second access token sent by the second OAuth server, and provide second service resources to the first service provision subsystem for access after successful authentication.

4. The system of claim 2, wherein the second service provision subsystem comprises a second client, a second OAuth server and a second resources server;

the first client is configured to send the commands for requesting a temporary credential to the first OAuth server and the second OAuth server, respectively, receive the first and second temporary credentials returned by the first OAuth server and the second OAuth server, respectively, send the second temporary credential to the user terminal for authorization; receive the second authorization credential returned by the user terminal, send the second authorization credential to the second OAuth server to exchange for the second access token, send the second access token to the second resources server for authentication, and access the resources provided by the second resources server after successful authentication by the second resources server; the first client is further configured to send the first temporary credential to the second client;

the first OAuth server is configured to receive the command for requesting a temporary credential from the first client, return the first temporary credential to the first client according to the command, receive the first authorization credential from the second client, return the first access token to the second client and send the first access token to the first resources server to serve as a basis of the authentication;

the first resources server is configured to receive the first access token from the second client, authenticate the first access token sent by the second client according to the first access token sent by the first OAuth server, and provide the first service resources to the second client for access after successful authentication;

the second client is configured to receive the first temporary credential from the first OAuth server and modify the identifier of the first client in the first temporary credential to be the identifier of the second client, send the modified first temporary credential to the user terminal for authorization, receive the first authorization credential returned by the user terminal, send the first authorization credential to the first OAuth server to exchange for a first access token, send the first access token to the first resources server for authentication, and access the resources provided by the first resources server after the successful authentication by the first resources server;

the second OAuth server is configured to receive the command for requesting temporary credential from the first client, return the second temporary credential to the first client according to the command, receive the second authorization credential from the first client, return the second access token to the first client and send the second access token to the second resources server as a basis of the authentication; and the second resources server is configured to receive the second access token from the first client, authenticate the second access token sent by the first client according to the second access token sent by the second OAuth server, and provide second service resources to the first client for access after successful authentication.

5. The system of claim 3, wherein the command for requesting a temporary credential is carried by a temporary credential request packet defined by an OAuth protocol.

6. A client provided in a service provision subsystem, the service provision subsystem further comprising an Open Auth (OAuth) server and a resources server; the client comprising a memory storing programming instructions and a processor configured to be capable of executing the stored programming instructions to perform steps comprising:

sending commands for requesting a temporary credential to the OAuth server of the service provision subsystem at a local side and an OAuth server of a service provision subsystem at another side, respectively, receiving a first temporary credential returned by the OAuth server of the service provision subsystem at the local side and a second temporary credential returned by the OAuth server of the service provision subsystem at the another side, respectively, and sending the first temporary credential to a client of the service provision subsystem at the another side;

sending the second temporary credential to a user terminal for authorization, receiving an authorization credential returned by the user terminal and sending the authorization credential to the OAuth server of the service provision subsystem at the another side to exchange for an access token; and sending the access token to a resources server of the service provision subsystem at the another side for authentication, accessing resources provided by the resources server of the service provision subsystem at the another side after successful authentication by the resources server of the service provision subsystem at the another side.

7. A client provided in a service provision subsystem, the service provision subsystem further comprising an OAuth server and a resources server; the client comprising a memory storing programming instructions and a processor configured to be capable of executing the stored programming instructions to perform steps comprising:

receiving a first temporary credential from an OAuth server of a service provision subsystem at another side, and modifying a client identifier of the service provision subsystem at the another side in the first temporary credential to be a client identifier of the service provision subsystem at a local side;

sending the modified first temporary credential to a user terminal for authorization, receiving a first authorization credential returned by the user terminal, and sending the first authorization credential to the OAuth server of the service provision subsystem at the another side to exchange for a first access token; and sending the first access token to a resources server of the service provision subsystem at the another side for authentication, and accessing resources provided by the resources server of the service provision subsystem at the another side after successful authentication by the resources server of the service provision subsystem at the another side.

8. A method for bidirectional authorization, comprising:

acquiring, by a first service provision subsystem, a first temporary credential of the first service provision subsystem and a second temporary credential of a second service provision subsystem, sending the second temporary credential to a user terminal for authorization and obtaining a second authorization credential, sending the second authorization credential to the second service provision subsystem to exchange for a second access token, acquiring resources in the second service provision subsystem according to the second access token, and sending the first temporary credential to the second service provision subsystem for modification of an identifier; and sending, by the second service provision subsystem, the modified first temporary credential to the user terminal for authorization and obtaining a first authorization credential, sending the first authorization credential to the first service provision subsystem to exchange for a first access token, and acquiring resources in the first service provision subsystem according to the first access token.

9. The method of claim 8, wherein acquiring, by the first service provision subsystem, the first temporary credential of the first service provision subsystem and the second temporary credential of the second service provision subsystem comprises:

sending, by a first client of the first service provision subsystem, commands for requesting a temporary credential to a first OAuth server of the first service provision subsystem and a second OAuth server of the second service provision subsystem, respectively, and receiving the first and second temporary credentials respectively returned by the first and second OAuth servers.

10. The method of claim 8, wherein, the authorization for the first temporary credential comprises inputting a user name and a password of the first service provision subsystem, wherein the user name and the password are a user name and a password registered by the user terminal at the first service provision subsystem; and the authorization for the second temporary credential comprises inputting a user name and a password of the second service provision subsystem, wherein the user name and the password are a user name and a password registered by the user terminal at the second service provision subsystem.

11. The method of claim 9, wherein, the authorization for the first temporary credential comprises inputting a user name and a password of the first service provision subsystem, wherein the user name and the password are a user name and a password registered by the user terminal at the first service provision subsystem; and the authorization for the second temporary credential comprises inputting a user name and a password of the second service provision subsystem, wherein the user name and the password are a user name and a password registered by the user terminal at the second service provision subsystem.

* * * * *